(12) United States Patent
Uranga (10) Patent No.: US 6,389,835 B1
(45) Date of Patent: May 21, 2002

(54) MISTING SYSTEM FOR VEHICLES (76) Inventor: Joel S. Uranga, 4633 Morningstar Dr., Flower Mound, TX (US) 75028

( * ) Notice: Subject to any disclaimer, the term of this patent is extended or adjusted under 35 U.S.C. 154(b) by 0 days.

(21) Appl. No.: 09/583,855

(22) Filed: May 31, 2000

Related U.S. Application Data (60) Provisional application No. 60/137,193, filed on Jun. 2, 1999.

(51) Int. Cl.$^7$ ............................. B01F 3/04; B60H 1/32
(52) U.S. Cl. ........................................ 62/306; 62/244
(58) Field of Search .................... 62/304, 306, 310, 62/314, 244

(56) References Cited

U.S. PATENT DOCUMENTS

| | | |
|---|---|---|
| 3,993,245 A | 11/1976 | Smith |
| 4,043,510 A | 8/1977 | Morris |
| 4,048,994 A | 9/1977 | Lo |
| 4,067,485 A | 1/1978 | Soin |
| 4,120,425 A | 10/1978 | Bethurum |
| 4,206,877 A | 6/1980 | Hoza, III |
| 4,328,843 A | 5/1982 | Fujii |
| 4,360,368 A | 11/1982 | Lyon |
| 4,407,454 A | 10/1983 | Massey |
| 4,458,830 A | 7/1984 | Werding |
| 4,526,298 A | 7/1985 | Boxer et al. |
| 4,651,903 A | 3/1987 | Pagliai |
| 4,658,597 A | 4/1987 | Shum |
| 4,688,643 A | 8/1987 | Carter et al. |
| 4,708,088 A | 11/1987 | Purvis et al. |
| 4,721,250 A | 1/1988 | Kennedy et al. |
| 4,765,542 A * | 8/1988 | Carlson ...................... 239/289 |
| 4,807,813 A | 2/1989 | Coleman |
| 4,836,409 A | 6/1989 | Lane |
| 4,867,344 A | 9/1989 | Bitterly |
| 4,875,508 A | 10/1989 | Burke, II et al. |
| 4,930,664 A * | 6/1990 | Ellison .......................... 222/1 |
| 5,005,367 A | 4/1991 | Hwang |
| 5,046,449 A | 9/1991 | Nelson |
| 5,060,833 A * | 10/1991 | Edison et al. ............... 224/148 |
| 5,069,363 A | 12/1991 | Daimler |
| 5,104,016 A | 4/1992 | Runkel |
| 5,112,535 A | 5/1992 | Roberson |
| 5,141,462 A | 8/1992 | Latzel |
| 5,150,819 A | 9/1992 | Johnson et al. |
| 5,154,324 A | 10/1992 | Stratford |
| 5,158,212 A | 10/1992 | Sirhan |

(List continued on next page.)

OTHER PUBLICATIONS

Cool Carts, Inc., Web Page updated Jan. 1, 2000 info@coolcarts.comhttp://www.coolcarts.co, Tempe, AZ 85281.

Mist'n Go, Web Page, http:///www. mistngo.com/mist-ngog.html.

Misty Mate, Web page, https://dynamic.internetconnect.net/cgi–win/vb2fpdde.exe?D:/forsale/mis . . . /mis_dvb.ini~mai.

Mistyou, Web Page, http://www.mistyou.com/prod.html.

*Primary Examiner*—William C. Doerrler (57) ABSTRACT

A portable misting system is disclosed for producing mist atomization in remote locations without pressurized water supplies. The system is easily retrofitted to open vehicles such as golf carts and forklifts. The system may be pressurized during filling by a pressurized water supply source. In the absence of a pressurized water supply, the system may be pressurized manually. In a preferred embodiment, a manifold for a misting system is disclosed having internally threaded ends, and a centrally located internally threaded inlet. The manifold provides a streamlined design for reliable fluid distribution that is easily attached to vehicles such as golf carts and forklifts. The system can also be used on boats, campsites, parks, playgrounds, construction sites, and other locations.

1 Claim, 6 Drawing Sheets

U.S. PATENT DOCUMENTS

| | | | | |
|---|---|---|---|---|
| 5,285,654 A | | 2/1994 | Ferdows | |
| 5,337,960 A | * | 8/1994 | Allen | 239/280.5 |
| 5,373,703 A | | 12/1994 | Pal | |
| 5,478,015 A | | 12/1995 | Black | |
| 5,535,951 A | | 7/1996 | Utter | |
| 5,613,371 A | * | 3/1997 | Nelson | 62/244 |
| 5,620,140 A | * | 4/1997 | Utter | 239/153 |
| 5,622,056 A | | 4/1997 | Utter | |
| 5,961,047 A | * | 10/1999 | Kleinberger | 239/124 |
| 6,151,907 A | * | 11/2000 | Hale | 62/314 |
| 6,189,805 B1 | * | 2/2001 | West et al. | 239/74 |

* cited by examiner

MISTING SYSTEM FOR VEHICLES

CROSS-REFERENCE TO RELATED APPLICATION

This application claims the benefit of the filing date of Provisional Application No. 60/137,193, filed Jun. 2, 1999.

BACKGROUND OF THE INVENTION

1. Technical Field

This invention relates generally to the field of fluid atomization for evaporative cooling, and more particularly to a device for directable mist atomization for cooling the occupants of golf carts or other open-air vehicles.

2. Description of the Related Art

Heat illness is associated with the cause of death of over 4,000 people annually in the United States. The risk of heat illness such as heat exhaustion and heat stroke, are directly related to the temperature-humidity index. It is commonly known that the process of atomizing water provides a cooling effect. The atomization of water into a fine mist can reduce the ambient temperature from 10 to 25 degrees depending upon the relative humidity. In recent years, a number of water atomization or "misting" devices have been produced for pool and patio applications, restaurants, outdoor theme parks, zoos, etc. Most of these applications utilize conventional water or plumbing lines to provide both a water source and the necessary system pressurization to create a cooling mist.

Many of the early atomization nozzles were actually designed for livestock and pesticide applications. This agricultural technology eventually was transferred into water atomization devices for human comfort.

The golfing industry suffers seasonal lows when the weather becomes hot. Conventional air-conditioning systems for golf carts and other open vehicles such as forklifts are impractical. Field tests have shown that golfers will play more often in hot weather if the vehicles are equipped with misting systems.

Many workers drive forklifts and engage in strenuous work outdoors. Other workers drive forklifts and engage in strenuous work inside buildings without airconditioning systems or sufficient ventilation, such as warehouses. In addition to the inefficiencies associated with being uncomfortable while working, these workers are at risk of heat related illnesses. Misting systems attached to forklifts can substantially improve the attitude and productivity of the workers while reducing their exposure to the risks of heat-related illnesses.

To address the problem of heat-related discomfort and illnesses, numerous devices have been patented or otherwise marketed. The majority of these devices are designed to be carried by hand, and do not address the volume, and hands-free requirements of individuals operating open-air vehicles. Other devices require the introduction of pressurized air or water. These devices are not appropriate for vehicular systems that may travel far from pressurized water and compressed air sources. Still other devices are complex in nature, requiring retrofitting of electrical devices and motors that limit the range of travel of electric vehicles and are expensive to install and maintain.

U.S. Pat. No. 5,622,056 and U.S. Pat. No. 5,535,951 disclose personalized atomization devices that are portable in nature. These devices have reservoirs divided into separate sealed sections by a flexible internal bladder, and quick-disconnect hose and nozzle couplings. These systems utilize the pressure of city water lines to fill an internal bladder while compressing the air inside of a secondary chamber surrounding the bladder. The disadvantages of these devices are that they incorporate the complex construction of a flexible bladder sealingly installed in a secondary containment reservoir, lack a functional distribution system for use in open vehicles, and are restricted to use in areas in immediate proximity to a pressurized water system or a compressed air source.

U.S. Pat. No. 5,620,140, a personal, portable cooling device utilizes a manual pumping chamber to achieve water atomization and provides for conductive cooling in addition to convective cooling, and allows for remote system pressurization. The disadvantages of this and similar devices are that the conductive cooling function is inapplicable to vehicle installations, they lack a functional distribution system for use in open vehicles, require separate operational steps to fill the reservoir and to compress the air in the reservoir, and they lack a capability to utilize alternative energy sources to compress air in the reservoir, relying instead on the energy of the person using the device to continuously pump air into the reservoir by hand.

U.S. Pat. No. 5,112,535 describes a vehicle having a cooling system which utilizes a recirculating evaporative water cooler and motor driven sprayers, with the system mounted on the roof of the vehicle. The disadvantages of these devices are that they are large, heavy, aesthetically obtrusive, noisy, expensive, difficult to retrofit to existing vehicles, require electrical power to operate, and are subject to substantial maintenance and repair.

U.S. Pat. No. 5,613,371 discloses a system for providing water mist to the occupants of open vehicles such as golf carts. This system utilizes the power system of the vehicle to electrically pump water to atomizing nozzles. The system requires a relatively elaborate design of equipment, including an electrical water pump, accumulator, fuses, on/off switches, and a separate water tank. The disadvantages of these devices are that they are difficult to retrofit to existing vehicles, expensive, complex, and require electrical power to operate. Power supplied to accessory systems from electric carts is undesirable since it reduces the duration for which the vehicle can operate.

It is an object of the present invention to eliminate the disadvantages and limitations associated with the existing technology. What is needed further is a system that provides a uniform distribution of the fluid supply to the atomizing nozzles that can be adjusted as to direction and flow between individual occupants of the vehicle, that is esthetically appealing and unobtrusive, that is economical and easily retrofitted to vehicles, and that can be assembled primarily from commercially available components.

SUMMARY OF THE INVENTION

A primary advantage of a preferred embodiment of the present invention is that it provides a simple, easily installed and retrofitted cooling apparatus for golf carts and other open-air vehicles. This is important since provision of this type of equipment normally involves assembly and attachment to numerous vehicles.

Another advantage of a preferred embodiment of the present invention is that it is relatively inexpensive as compared to other devices designed for misting open vehicles. This is again important since application normally requires retrofitting dozens of golf carts or forklifts.

Another advantage of a preferred embodiment of the present invention is that it is unobtrusive, and has a minimum component, streamlined design. This is most important when attaching a misting system to a golf cart on an expensive private course.

Another advantage of a preferred embodiment of the present invention is that it provides a design that is simple to operate and maintain, and highly reliable, having no electric motors or moving parts, thus minimizing the likelihood of mechanical or electrical failure.

Another advantage of a preferred embodiment of the present invention is that the reservoir can be either manually pressurized or pressurized automatically during filling. This allows for fast, effortless, single operational step pressurization and filling when a pressurized water source is available, while still providing a remote pressurization capability.

Another advantage of a preferred embodiment of the present invention is that it provides a design that can be utilized in numerous locations and applications, both human and non-human, including golf carts, forklifts, boats, live animal trailers, outdoor parks and camp sites, construction sites and the like.

Another advantage of a preferred embodiment of the present invention is that it provides a unitary manifold capable of receiving both pipe-threaded attachment of directable nozzles assemblies and inlet connections from the reservoir without the requirement for additional adaptive hardware. This substantially simplifies assembly and improves the reliability and appearance of the device.

Another advantage of a preferred embodiment of the present invention is that it has a long-lasting water reservoir with a built-in pump sprayer. This permits the use of readily available pump spray units and their component parts.

Another advantage of a preferred embodiment of the present invention is that it provides manual control over the direction of the mist. This allows the occupants of the vehicle to adjust the mist in accordance with their own personal preferences.

Another advantage of a preferred embodiment of the present invention is that it provides a uniform distribution of the fluid supply to the atomizing nozzles, and manual control over the flow of mist to individual nozzles. This allows the occupants of the vehicle to turn the mist on and off to accommodate the personal preferences of individual occupants of the vehicle.

Another advantage of a preferred embodiment of the present invention is that it provides a distribution of the fluid supply to the atomizing nozzles that is aesthetically appealing and unobtrusive, and that is economical and easily retrofitted to vehicles.

Other advantages of the present invention will become apparent from the following descriptions, taken in connection with the accompanying drawings, wherein, by way of illustration and example, an embodiment of the present invention is disclosed.

The present disclosure is for a vehicle misting device designed for easy, reliable, and economical retrofit attachment to open vehicles such as golf carts and forklifts. In a preferred embodiment the device comprises a fluid reservoir having an air pump and a quick-disconnect hose coupling attached. A fluid conduit is connected at one end to the reservoir and at the opposite end to a tubular manifold. Valves are connected one each to each end of the manifold. Flexible conduit portions are connected one each to each of the valves, and atomization nozzles are connected one each to each of the flexible conduit portions.

In another preferred embodiment the outside diameter of the manifold is approximately 0.81 inches, so as to be readily secured by commercially available clamping devices.

In another preferred embodiment, the inside diameter of the manifold is approximately 0.44 inches, so as to be receivable of a ¼-18 NPT thread into the ends of the manifold, and thereby being readily connectable to a nozzle assembly.

In another preferred embodiment, the wall thickness of the manifold is at least approximately 0.18 inches.

In another preferred embodiment, the flexible conduit portions are ball and socket elements, which allow reliable independent positioning of the nozzle assemblies.

In another preferred embodiment, a receptacle is connected in-line between the nozzle and the flexible conduit, and a filter is located within the receptacle, adjacent to the flexible conduit.

In another preferred embodiment, a receptacle is connected in-line between the nozzle and the flexible conduit and an anti-drip ball and spring is located inside the receptacle, adjacent to the nozzle.

In another preferred embodiment, there is at least one mounting clamp attached to the manifold.

In another preferred embodiment, a pair of mounting clamps are attached to the manifold on opposite sides of the fluid conduit connection to the manifold, for securing the manifold to the vehicle.

In another preferred embodiment, the mounting clamps have an adhesive backing to allow quick, removable attachment of the manifold to the vehicle.

In another preferred embodiment, a tubular manifold portion has internally threaded ends, and a centrally located internally threaded inlet connecting the exterior of the manifold to interior of the manifold.

In another preferred embodiment, the manifold ends have a ¼-18 NPT thread.

In another preferred embodiment, the manifold inlet has a ⅛-27 NPT thread.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
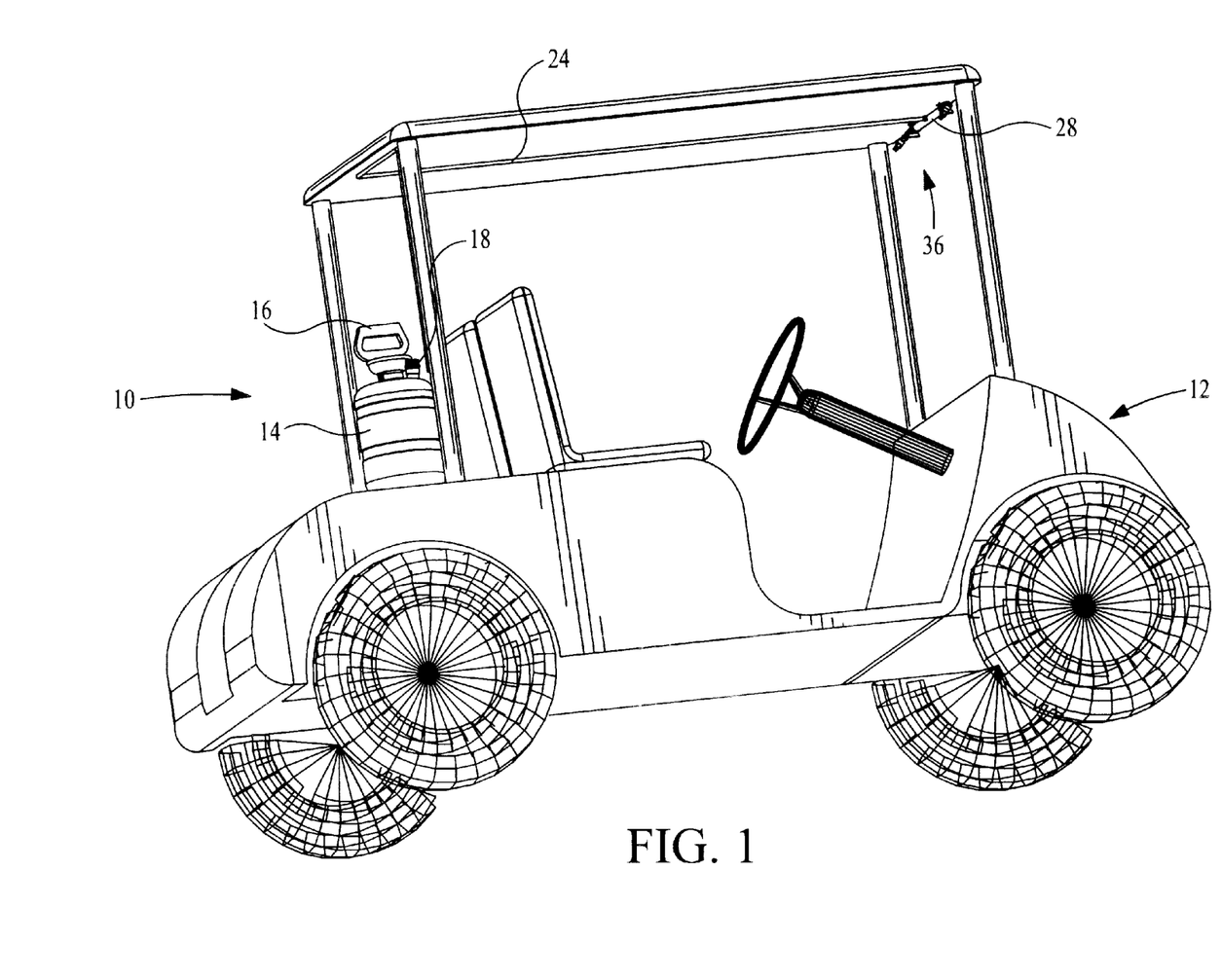
FIG. 1 is an isometric view in accordance with a preferred embodiment of the present invention. In this view, the primary components of the system are shown connected and assembled in place on a vehicle.
Figure 2:
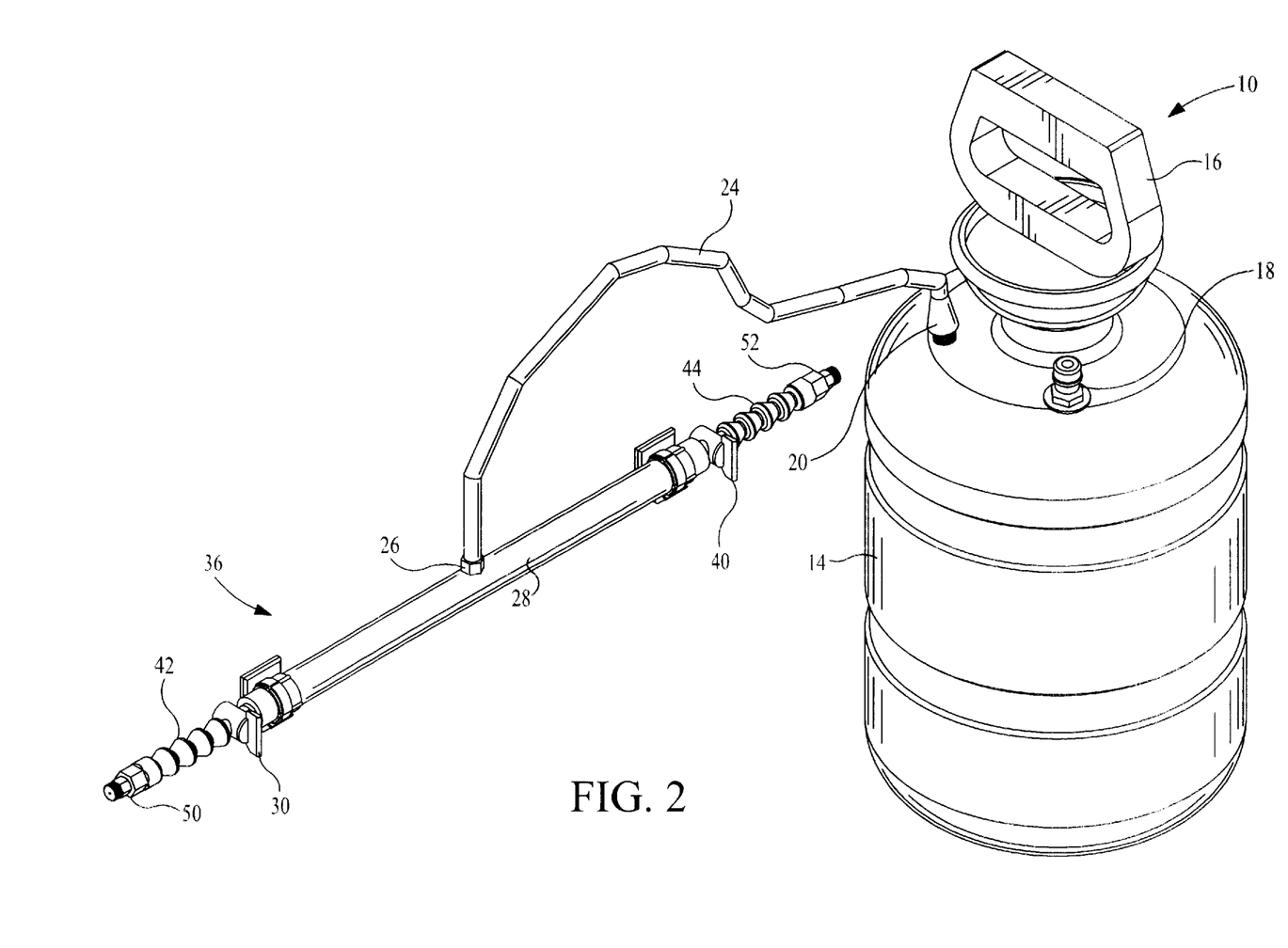
FIG. 2 is an isometric view of the primary components of a preferred embodiment of the present invention, illustrated as assembled separate from a vehicle.
Figure 3:
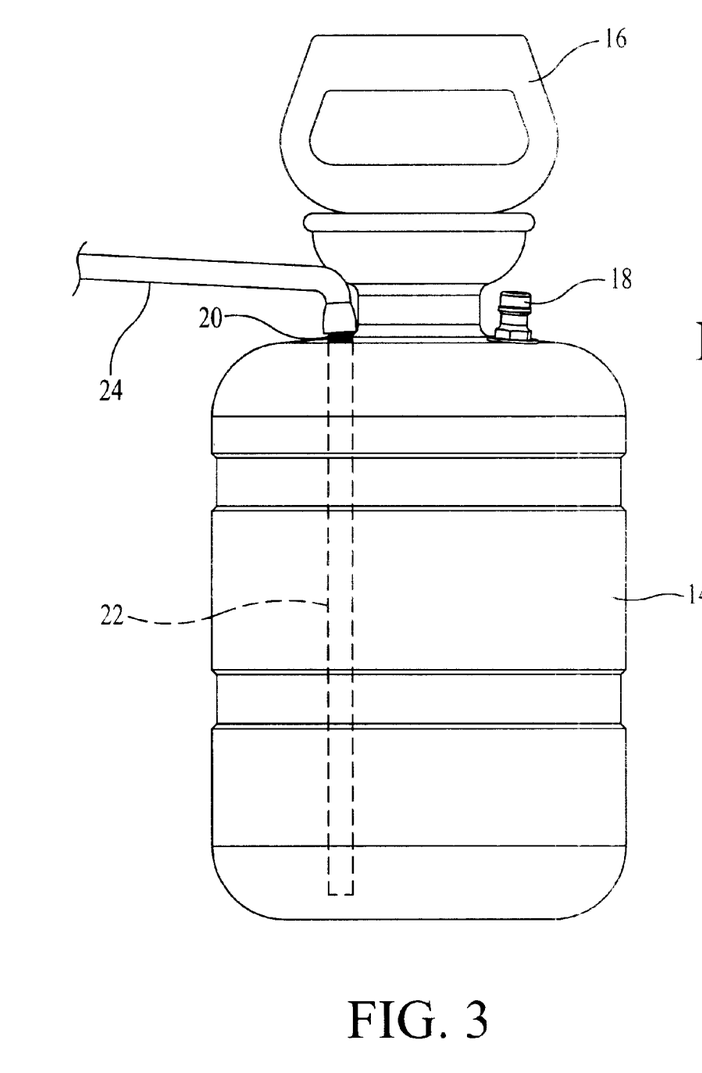
FIG. 3 is an isometric view of the combination pump-reservoir component of a preferred embodiment of the present invention.
Figure 3A:
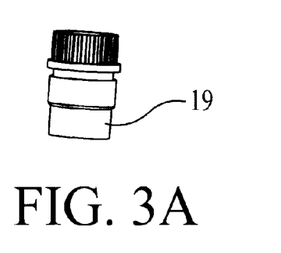
FIG. 3A is an isometric view of the female quick-disconnect coupling for threaded connection to a garden hose or other pressurized water supply source, which permits quick, sealed connection of the water supply source to the reservoir.
Figure 4:
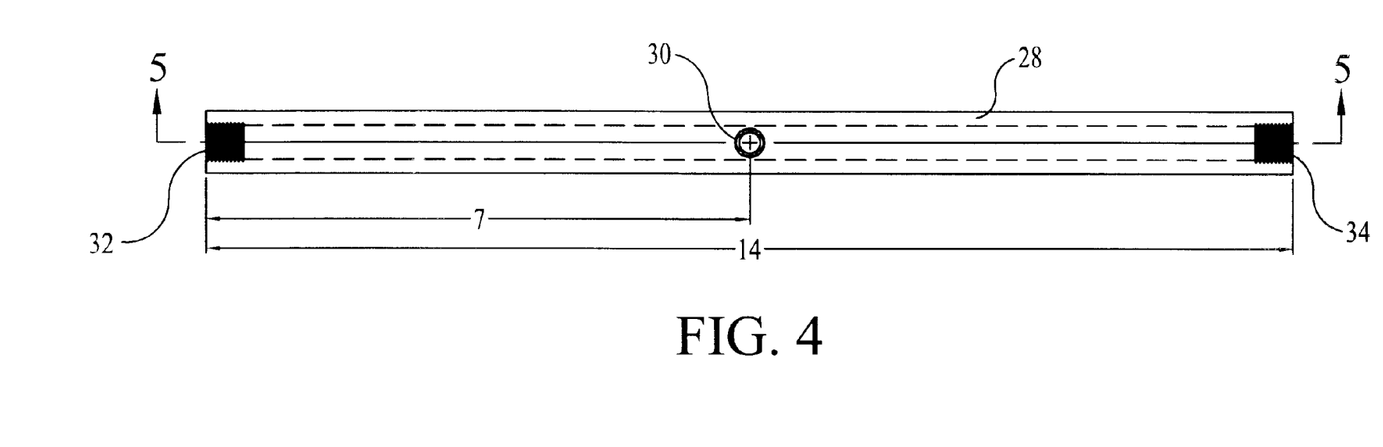
FIG. 4 is a side view of the manifold of a preferred embodiment of the present invention.
Figure 5:
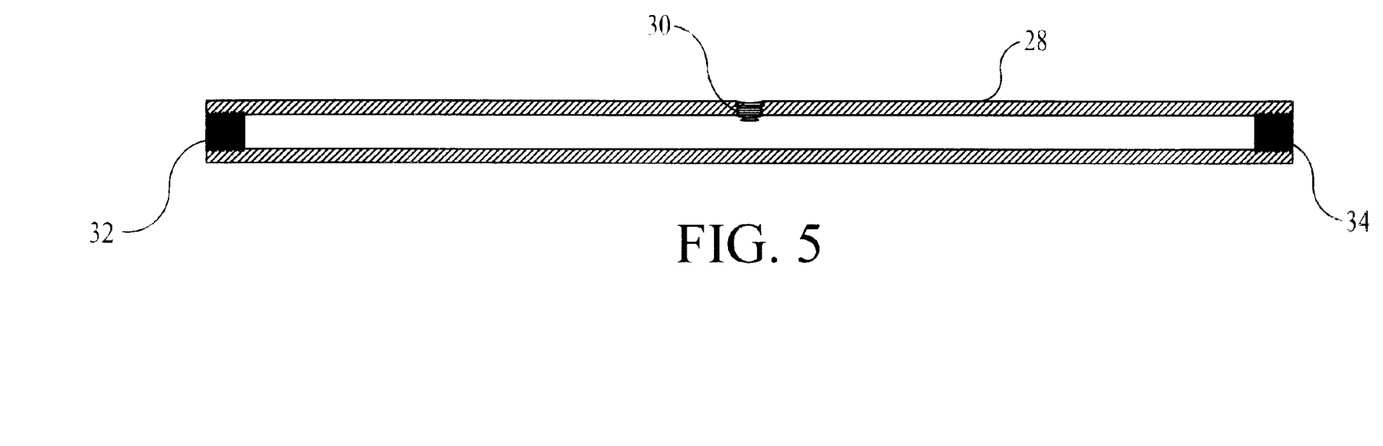
FIG. 5 is a cross-sectional top view of the manifold of the preferred embodiment of the present invention shown in FIG. 5.

Referring to FIG. 1, there is shown a general overview of the invention. In this view, a misting system 10 is shown installed on a vehicle 12. Referring to FIG. 2, the primary components of a preferred embodiment of the misting system of the present mi invention are shown. A reservoir 14 has an integral manual air pump 16. In a more preferred embodiment, reservoir 14 is a commercially available garden sprayer, such as in commercially available from various sources, including: Root-Lowell Manufacturing Company, 1000 Foreman Road, Lowell, Mich. 493313. Referring to FIG. 3, a quick-disconnect valve 18 is connected to reservoir 14. Referring to FIG. 3A, a complementary coupling 19 is provided for threaded connection to a garden hose or other pressurized water supply source. Referring back to FIG. 3, a reservoir connection 20 is connected near to an inlet 22 (hidden lines) of a tubular fluid conduit 24. Inlet 22 of fluid conduit 24 is located inside, and near to the bottom of reservoir 14. Referring back to FIG. 2, fluid conduit 24 has an opposite outlet 25 connected by a manifold connection 26 to a tubular manifold 28. In a preferred embodiment, manifold 28 has an outside diameter of approximately 0.81 inches. In another preferred embodiment, manifold 28 has an inside diameter of approximately 0.44 inches. In another preferred embodiment, manifold 28 has a wall thickness of at least approximately 0.18 inches. In a more preferred embodiment, manifold 28 is made of a PVC material, extruded to within the preferred dimensions. In a still more preferred embodiment shown in FIG. 4 and FIG. 5, manifold 28 has a threaded manifold inlet 30 for threaded attachment of manifold connection 26. In a still more preferred embodiment, manifold inlet 30 is threaded with a ⅛-27 NPT thread. Still referring to FIG. 4 and FIG. 5, in another preferred embodiment, manifold 28 has an internally threaded first end 32 and an opposite internally threaded second end 34. In a still more preferred embodiment, first end 32 and second end 34 are threaded with a ¼-18 NPT thread.

Figure 6:
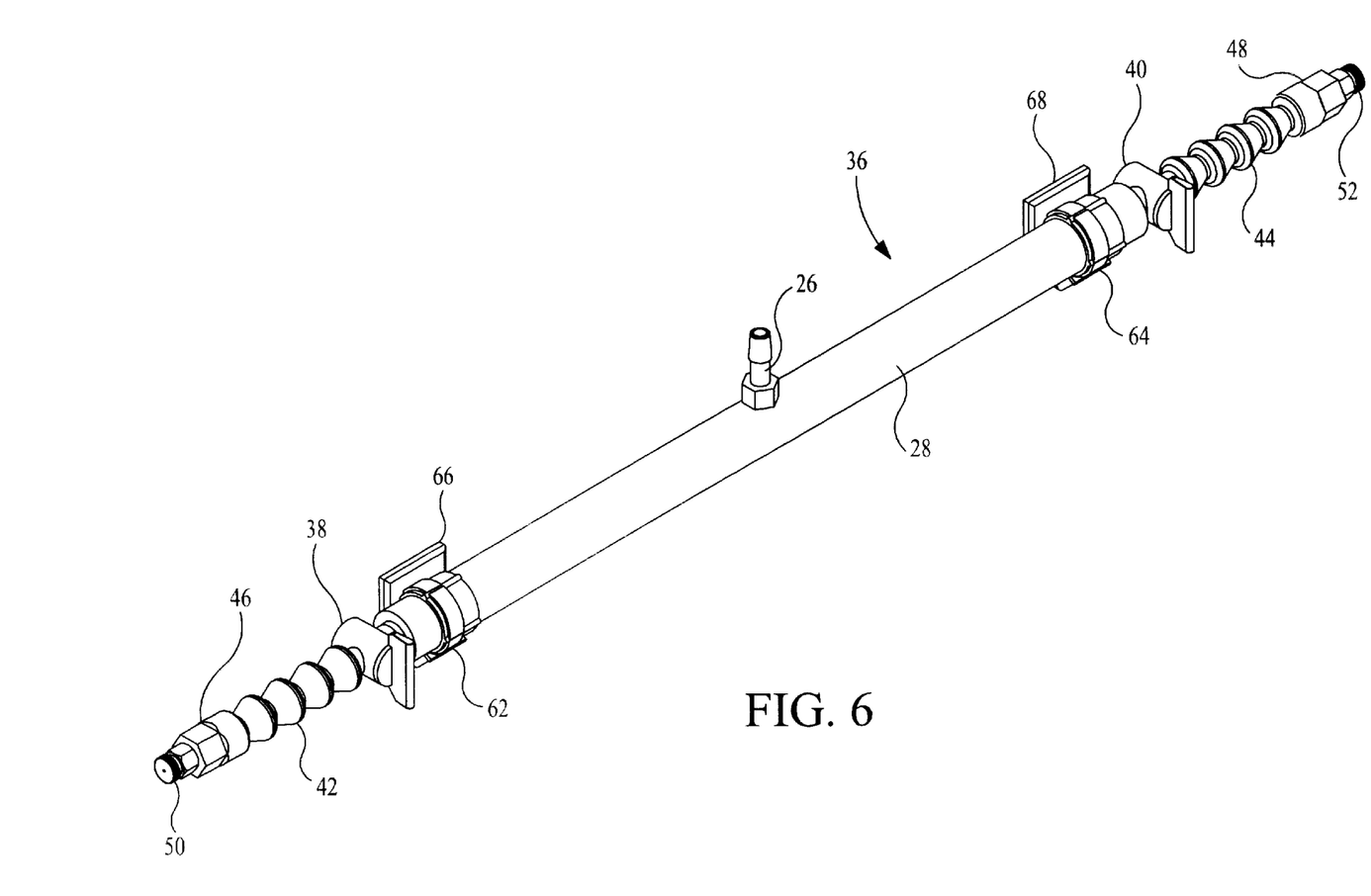
FIG. 6 is an isometric view of the misting assembly of a preferred embodiment of the present invention. In this view, the nozzle assemblies are shown connected to the ends of the manifold.

Referring to FIG. 6, there is shown an isometric view of a misting assembly 36 of a preferred embodiment of the present invention. In this view, a first valve 38 is connected to manifold first end 32, and a second valve 40 is connected to manifold second end 34. A first flexible conduit 42 is connected to first valve 38, and a second flexible conduit 44 is connected to second valve 40. In a more preferred embodiment, first flexible conduit 42 and second flexible conduit 44 are of the ball and socket configuration that is commonly commercially available. For example, these component parts of the invention can be purchased from various companies including Lockwood Products, Inc. 5615, S.W. Willow Lane, Oswego, Oreg., 97035.

At the distal end of first flexible conduit 42 is a first threaded end element 46. Likewise, at the distal end of second flexible conduit 44 is a second threaded end element 48. A first nozzle assembly 50 is connected to first end element 46, and a second nozzle assembly 52 is connected to second end element 48.

Figure 7:
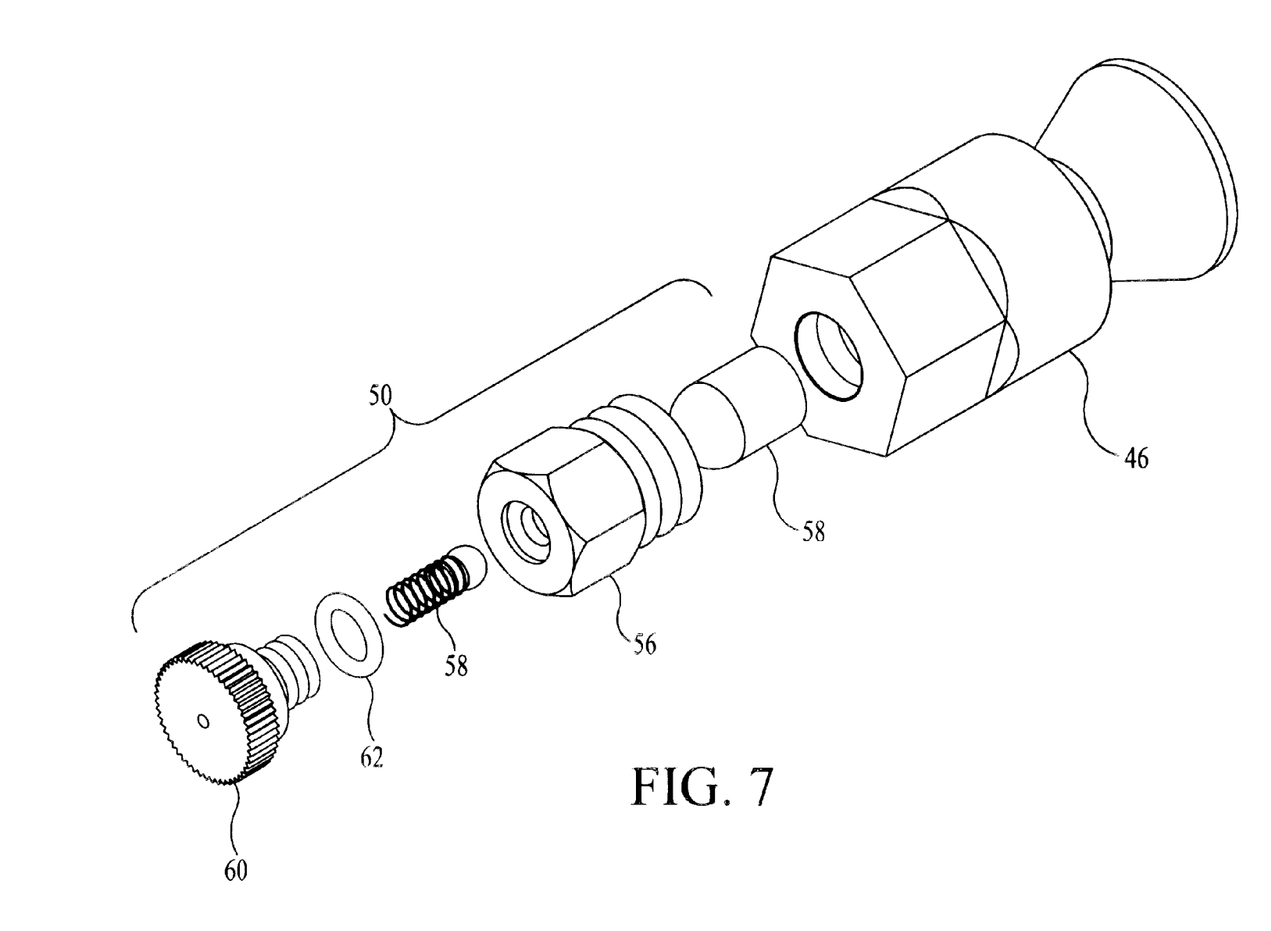
FIG. 7 is an exploded isometric view of the nozzle assembly of a preferred embodiment of the present invention. In this view, the nozzle, ball and spring anti-drip device, receptacle, and filter are shown in line for connection to the end of the flexible conduit.

Referring to FIG. 7, an exploded isometric view of nozzle assembly 50 of a preferred embodiment of the present invention is shown. In this view, a threaded first receptacle 54 is threadedly connected to first end element 46. In this preferred embodiment, a filter element 56 is located between first receptacle 54 and first end element 46. In another preferred embodiment, a first ball and spring anti-drip device 58 is located inside the opposite end of first receptacle 54. A nozzle 60 is threadedly connected to receptacle 54. In a preferred embodiment, nozzle 60 has a flow rating of 0.75 gallons per hour. A first o-ring seal 62 seals the connection between nozzle 60 and receptacle 54. Although FIG. 7 shows the components of nozzle assembly 50, the same components are present but not shown, in the same configuration and relationship in nozzle assembly 52, shown in FIG. 6.

Referring again to FIG. 6, in a preferred embodiment of the present invention, a first clamp 64 and a second clamp 66 are circumferentially attached to manifold 28 and secured to vehicle 12. In a more preferred embodiment, clamps 64 and 66 have an adhesive backing 68 and 70 respectively, for easy attachment to vehicle 12. In a still more preferred embodiment, clamps 64 and 66 are of the commercially available plastic semi-circular cable clamp type.

OPERATION

A misting system 10 is shown installed on a vehicle 12. Referring to FIG. 2, the primary components of a preferred embodiment of misting system 10 of the present invention are shown. Referring to FIG. 3, reservoir 14 includes integral manual air pump 16. Quick-disconnect valve 18 is connected to reservoir 14. Complementary coupling 19 is threadedly connected to the end of a garden hose for easy attachment and release to quick-disconnect valve 18. Thus, to fill reservoir 14 with water for service, a garden hose fitted with coupling 19 is connected to valve 18. When the water is turned on, it flows past valve 18 into reservoir 14. Valve 18 is a one-way valve, which prevents the escape of air pressure and water from reservoir 14. Misting system 10 is a closed system, so the addition of water into reservoir 14 at the pressure of the supply source (i.e., city water line pressure) increasingly compresses the air in reservoir 14 as it is filled with water. Thus, as water enters reservoir 14, the air pressure inside of reservoir 14 exceeds the ambient air pressure.

As can best be seen in FIG. 3, conduit inlet 22 (hidden lines) of a tubular fluid conduit 24, extends downwardly inside of reservoir 14 to near the bottom of reservoir 14. It is at the open end of conduit inlet 22 that water enters conduit inlet 22 under pressure. Conduit inlet 22 is plumbingly connected to fluid conduit 24. Fluid conduit 24 is plumbingly connected to tubular manifold 28 by manifold connection 26 at manifold inlet 30. In a preferred embodiment, manifold 28 has a wall thickness of at least approximately 0.18 inches. This permits threading manifold inlet 30 with a ⅛-27 NPT thread for direct and sealed connection to a complimentary pipe thread on manifold connection 26, without further modification, adjustment, or hardware. This cannot be accomplished with standard ½ inch PVC pipe, since standard ½ inch schedule 40 PVC pipe has a wall thickness of only approximately 0.11 inches.

In a preferred embodiment, manifold 28 has an inside diameter of approximately 0.44 inches. This permits threading of manifold first end 32 and manifold second end 34 with a ¼-18 NPT thread to within recommended industry standards. This configuration threaded ends 32 and 34 of manifold 28 is especially desirable since it permits a direct and sealed connection of first end 32 and second end 34 with commercially available valves 38 and 40 having ¼-18 NPT threads without further modification, adjustment, or hardware. This cannot be accomplished with standard ½ inch PVC pipe since standard ½ inch schedule 40 PVC pipe has an inside diameter of approximately 0.62 inches.

In another preferred embodiment, manifold 28 has an outside diameter of approximately 0.81 inches. This approximate diameter is especially desirable since it permits the use of commercially available clamps 64 and 66 to attach misting system 36 to cart 12 quickly, and easily, by attaching clamps 64 and 66 around manifold 28 without further modification, adjustment, or hardware. This cannot be accomplished with standard ½ inch PVC pipe, since standard ½ inch schedule 40 PVC pipe has an outside diameter of approximately 0.84 inches. In a more preferred embodiment of the present invention, clamps 64 and 66 have an adhesive backing 68 and 70 respectively, for easy attachment to vehicle 12.

In a more preferred embodiment, manifold 28 is made of a PVC material, extruded to within the preferred dimensions detailed above. By extruding manifold 28 to the preferred dimensions, misting assembly 36 can be assembled with the fewest necessary parts, adding to the reliability, ease of assembly, cost effectiveness, and aesthetic value of assembly 36 and misting system 10.

Referring to FIG. 6, there is shown an isometric view of a misting assembly 36 of a preferred embodiment of the present invention. First valve 38 and second valve 40 provide independent control of spray mist to individual occupants of vehicle 12. Likewise, first flexible conduit 42 and second flexible conduit 44 provide additional control of spray mist to individual occupants of vehicle 12.

Referring to FIG. 1 and FIG. 2, valves 38 and 40 are closed when filling reservoir 14 from a water hose through quick-disconnect valve 18 so as to allow misting system 10 to become pressurized. As vehicle 12 is operated, valves 38 and 40 may be opened to start the flow of mist to the occupants of vehicle 12. When valves 38 and 40 are opened, the pressurized air in reservoir 14 forces water to travel sequentially through conduit inlet 22, through fluid conduit 24, past manifold connection 26, into manifold 28. Once in manifold 28, the water flow will be through whichever of valves 38 and 40 is in the open position. If both first valve 38 and second valve 40 are in the open position, the water flow is divided, with half flowing through first valve 38 and first nozzle assembly 50, the other half flowing through second valve 40 and second nozzle assembly 52.

As reservoir 14 loses water through misting, the volume of air space inside reservoir 14 increases, proportionally decreasing the air pressure inside of reservoir 14. Since air pressure provides the energy source for forcing water through misting system 10, it may eventually be necessary to increase the air pressure inside of reservoir 14 to continue misting. As vehicle 12 may have departed from the vicinity of a water supply, the occupants of vehicle 12 may use air pump 16 on reservoir 14 to add air to reservoir 14, thus increasing the air pressure sufficiently to continue forcing water through misting system 10. The option of using pump 16 also allows use of misting system 10 when reservoir 14 is filled from a non-pressurized water source.

Referring to FIG. 7, an exploded isometric view of nozzle assembly 50 of a preferred embodiment of the present invention is shown. In this view, threaded first receptacle 54 is connected to first end element 46. In this preferred embodiment, filter element 56 is located between first receptacle 54 and first end element 46 to prevent misting of impurities in the water supply and clogging of nozzle 60. In another preferred embodiment, a first ball and spring anti-drip device 58 is located inside of first receptacle 54 to prevent water dripping from nozzle 60 when the pressure inside misting system 10 is insufficient to atomize the water passing through nozzle 60. First o-ring seal 62 seals the connection between nozzle 60 and receptacle 54. Although the foregoing description refers to FIG. 7 and the components of nozzle assembly 50, the same components are present, but not shown, in the same configuration and operative relationship in nozzle assembly 52, shown in FIG. 6.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A misting system for attaching to an open-air vehicle having one or more occupants comprising:
    a fluid reservoir with an air pump attached;
    a quick-disconnect valve connected to the reservoir;
    a fluid conduit having an inlet end extending into the reservoir, and an opposite outlet end, the conduit adapted to be releasably fastened to the vehicle;
    one or more valves connected to the outlet end of the fluid conduit in general proximity to at least one occupant;
    a manifold to deliver pressurized fluid from the conduit to each valve;
    flexible conduit connecting each valve to a nozzle assembly connected to each valve so that the nozzle assembly may be adjusted for comfort of the occupant.

* * * * *